US007011379B2

(12) United States Patent
Rader et al.

(10) Patent No.: US 7,011,379 B2
(45) Date of Patent: Mar. 14, 2006

(54) CONTROL CIRCUIT FOR A CONTROLLED ELECTRO-MAGNETIC VALVE OF AN AUTOMOTIVE BRAKING SYSTEM

(75) Inventors: Thomas Rader, Reutlingen (DE); Alexander Haeussler, Heidelberg (DE); Frank Kaestner, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/182,589

(22) PCT Filed: Jan. 11, 2001

(86) PCT No.: PCT/DE01/00078

§ 371 (c)(1),
(2), (4) Date: Feb. 7, 2003

(87) PCT Pub. No.: WO01/58736

PCT Pub. Date: Aug. 16, 2001

(65) Prior Publication Data

US 2003/0173825 A1 Sep. 18, 2003

(30) Foreign Application Priority Data

Feb. 8, 2000 (DE) ................................ 100 05 424

(51) Int. Cl.
*B60T 8/00* (2006.01)
*B60T 8/32* (2006.01)

(52) U.S. Cl. ..................................... 303/119.2; 303/15

(58) Field of Classification Search ............. 303/119.3, 303/119.2, 119.1, 15, 155, 156–158, 20; 137/529, 137/625.65–625.68, 599.16; 251/129.11–129.22; 91/367; 310/30; 701/78, 70, 20, 93, 79; 361/160, 154, 155, 149, 191; 318/567, 620; 123/90.11

See application file for complete search history.

(56) References Cited

U.S. PATENT DOCUMENTS 5,048,790 A * 9/1991 Wells ...................... 251/30.04
5,645,097 A * 7/1997 Zechmann et al. ............ 137/1
5,742,467 A * 4/1998 Schmitz ...................... 361/154
6,314,358 B1 * 11/2001 Dorn et al. ................... 701/70
6,504,699 B1 * 1/2003 Rader et al. ................ 361/155
6,560,088 B1 * 5/2003 Beck et al. ................. 361/154
6,657,846 B1 * 12/2003 Philipp et al. .............. 361/160
2003/0173825 A1 * 9/2003 Rader et al. ............. 303/119.2

FOREIGN PATENT DOCUMENTS

DE 43 05 488 8/1994
DE 196 54 427 6/1998
DE 197 07 960 9/1998

(Continued)

OTHER PUBLICATIONS

Translation from STIC of WO99/39957.*

*Primary Examiner*—Douglas C. Butler
(74) *Attorney, Agent, or Firm*—Kenyon & Kenyon

(57) ABSTRACT

A control circuit for a controllable electric solenoid valve of a brake system of a motor vehicle is described, in which the actual values of a controlled variable (f(t)), e.g., the vehicle deceleration, a wheel slip, a driving speed, an angle of rotation or the like are returned to a predetermined tolerance band. The actual value of the controlled variable is measured continuously and compared with the predetermined tolerance band, which is stored in an EEPROM, for example. If the actual value of the controlled variable leaves the predetermined tolerance band (22), a correction device (15) intervenes and returns the actual value to the predetermined tolerance band by increasing or decreasing the trigger current for the solenoid valve (1).

19 Claims, 2 Drawing Sheets

FOREIGN PATENT DOCUMENTS

| | | | | |
|---|---|---|---|---|
| DE | 010005424 | A1 | * | 8/2001 |
| EP | 1257451 | | * | 4/2004 |
| JP | 2003-522074 | | * | 7/2004 |
| WO | WO 95 03196 | | | 2/1995 |
| WO | WO 99 39957 | | | 8/1999 |
| WO | WO 01/58736 | A2 | * | 2/2001 |

* cited by examiner $F_K = 0$ $F_K = F_{Mag} - F_F$

CONTROL CIRCUIT FOR A CONTROLLED ELECTRO-MAGNETIC VALVE OF AN AUTOMOTIVE BRAKING SYSTEM

BACKGROUND INFORMATION

The present invention relates to a controllable electric solenoid valve of a brake system of a motor vehicle according to the preamble of the main claim.

German Patent Application 43 05 488 A1 has already described a control circuit for a solenoid valve. With this control circuit, the trigger current for the solenoid valve is controlled so that the valve closing body is braked shortly before being moved from its flow-through position to its closed position. This yields the result that the solenoid valve closes with very little noise and thus interfering sound waves are not transmitted through the brake system to the motor vehicle. The virtually noiseless closing is achieved by briefly turning off the trigger current to support the valve closing body in the end position with a holding current.

German Patent Application 197 07 960 A1 also describes a method and a device for regulating the pressure in a wheel brake, a regulator for pressure regulation forming a trigger signal from the pressure relationships prevailing at the valve arrangement. To improve the quality of regulation for the pressure regulation in the brake circuit, one valve arrangement is provided for pressure buildup and another for pressure reduction. By measuring the actual brake pressure and comparing it with the setpoint pressure, a difference is determined and taken into account with an altered trigger signal. The relationship between the trigger signal and the pressure relationships is stored as a characteristic curve for the pressure buildup and/or pressure reduction.

ADVANTAGES OF THE INVENTION

The control circuit according to the present invention for a controllable electric solenoid valve in a brake position system of a motor vehicle having the characterizing features of the main claim has the advantage over the related art that a regulator monitors the actual value of the controlled variable in question and optionally takes a corrective measure. It is especially advantageous here that the controlled variable for the actual value is always within a predetermined tolerance band. If the actual value leaves the predetermined tolerance band, a correction device additionally intervenes, returning the actual value to the range of the tolerance band through an appropriate change in the trigger current of the solenoid valve. This advantageously yields the result that in a brake system, for example, quiet or virtually noiseless closing of the solenoid valve is achieved, while on the other hand, the brake pressure in the brake circuit is adjustable independently of the function of the regulator.

Advantageous refinements of and improvements on the control circuit characterized in the main claim are possible through the measures characterized in the dependent claims. It is particularly advantageous that the correction device is designed to alter the field current as a function of the closing force of the solenoid valve. Through appropriate characteristic curves determined empirically in advance, the closing force of the valve closing body is adjustable at will and is selected by taking into account the pressure in the line system, so that the closing body, for example, does not open when there is an increase in the line pressure due to an altered controlled variable. For example, if a current/pressure characteristic curve (I/P characteristic curve) has been stored as the controlled variable, then the control current for a certain pressure value may be obtained to advantage according to the characteristic curve. It is also advantageous that to regulate the driving dynamics or the brake performance of a vehicle, for example, the braking deceleration, the vehicle speed and/or wheel slip values may be selected as the controlled variable. These controlled variables are needed in particular for an antilock brake system (ABS) or the Electronic Stability Program (ESP).

It is also advantageous that the correction device forms a brake intervention measure in combination with Adaptive Cruise Control (ACC), as is also used in combination with a speed regulator, when the setpoint value for the distance is too low for safety reasons with respect to the driving speed.

A memory is advantageously provided for storing the characteristic curves for the controlled variable and/or the tolerance band. A suitable memory is preferably an EEPROM, because this memory does not lose its information even in a power failure.

An advantageous implementation also involves the correction device having a computer which calculates the actual value by using a software program. Software programs have the great advantage that they are easily modifiable without requiring complex wiring. In particular, in a motor vehicle having an antilock brake system or a driving dynamics regulator, this yields the advantage that correction of the controlled variable is easily implementable through a corresponding expansion of the existing control programs.

DRAWING

One embodiment of the present invention is illustrated in the drawing and explained in greater detail in the following description.

DESCRIPTION

Figure 1:
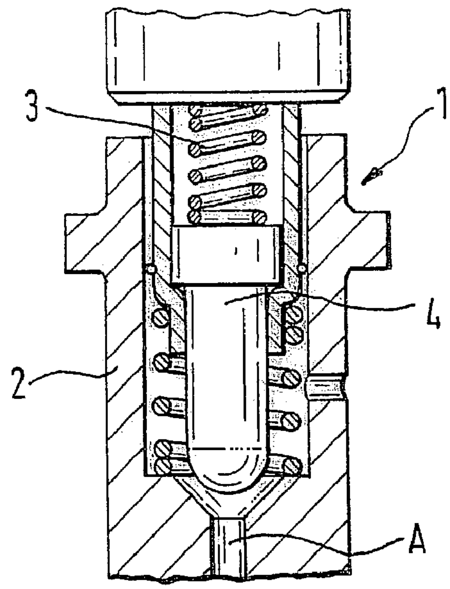
FIG. 1 shows an electric solenoid valve in an open flow-through position.
Figure 2:
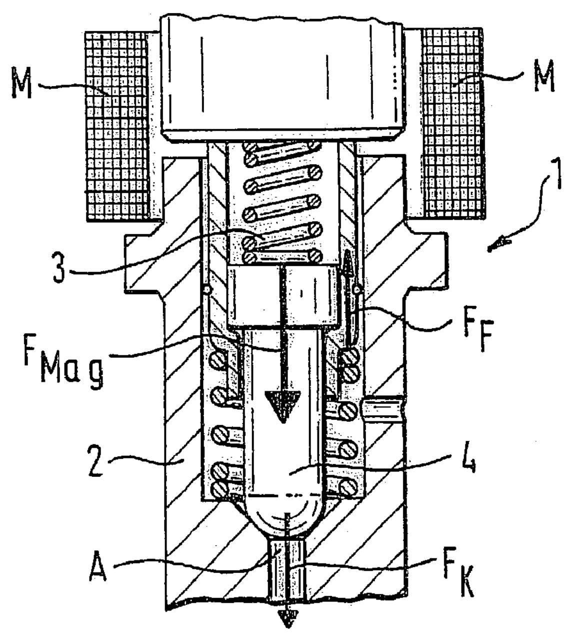
FIG. 2 shows an electric solenoid valve in an closed position.

For a better understanding, FIGS. 1 and 2 show an electric solenoid valve 1 in which a valve closing body 4 is shown in the opened position (FIG. 1) and in the closed position (FIG. 2). Solenoid valve 1 has a valve body 2 in which valve closing body 4 is situated inside a bore. Valve closing body 4 is designed in the lower part so that a hollow space is formed between the inside wall of valve body 2 and valve closing body 4, so that brake fluid is forced into this hollow space in the case of a brake system, for example. Closing body 4 is sealed at the top with respect to the inside wall of valve body 2. Closing body 4 is held in its basic position, preferably in the opened position according to FIG. 1, by one or more springs 3. In the upper area, a suitable solenoid M (not shown in detail) through which a field current flows is mounted on valve body 2. The magnetic force which develops acts on valve closing body 4 with a magnetizing force $F_{Mag}$ against spring force $F_F$ as indicated by the direction arrows in FIG. 2. Closing force $F_K$ which acts on the spherical cup and with which outlet A is closed is obtained from the difference between magnetizing force $F_{Mag}$ and spring force $F_F$. The closing force is controlled by the field current for the solenoid, so that the desired movement and holding force for valve closing body 4 are achieved.

Figure 3:
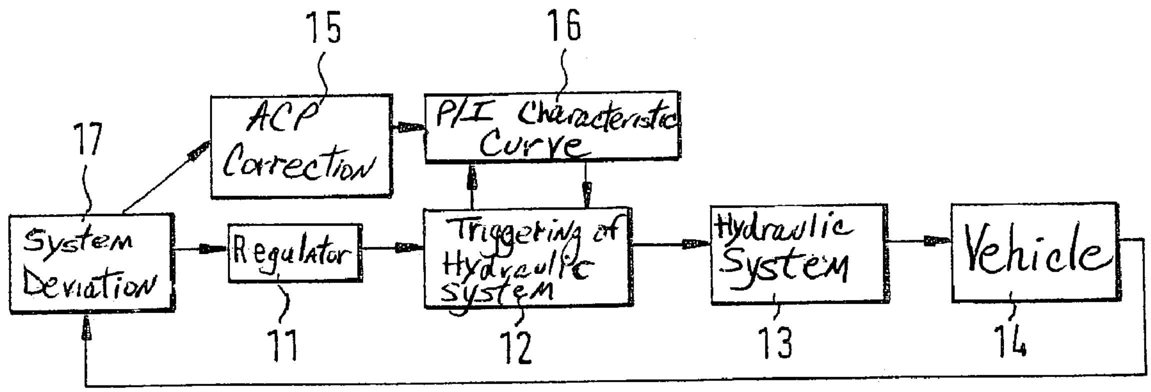
FIG. 3 shows a block diagram.

The functioning of the present invention will now be explained in greater detail on the basis of the embodiment according to FIGS. 3 and 4. In the case of control of an electric solenoid valve 1, the essential problem occurs that manufacturing tolerances, e.g., the size of the residual air gap between valve body 2 and the driving magnet, temperature effects, friction effects and wear may lead to different closing forces at the same trigger currents for the solenoid. The trigger current thus depends not only on the differential pressure over the valve but also the unwanted side effects mentioned above. A predetermined current/pressure characteristic curve (I/P characteristic curve) for triggering valve closing body 4 therefore necessarily leads to different closing forces $F_K$ which may then be compensated through an increase or decrease in the corresponding control current. However, increasing or decreasing the control current by regulation yields an unwanted time lag which is not desirable with the short reaction times that are required. For example, in the case of driving dynamics regulation, when the vehicle begins to swerve, it must be possible to brake the corresponding wheel of the vehicle through, if possible, an immediate brake response in order to stabilize the driving condition. Therefore, lengthy reaction times are unacceptable.

Figure 4:
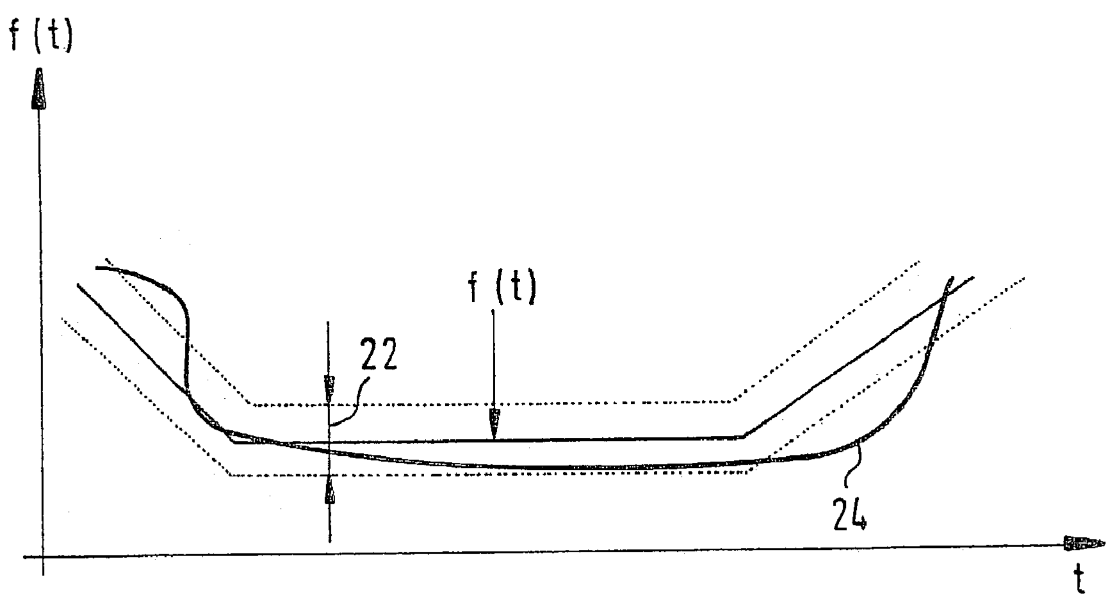
FIG. 4 shows a diagram.

Therefore, the implementation according to the present invention as shown in FIG. 4 is based on the fact that controlled variable f(t) which is to be controlled and/or regulated is measured continuously. In the case of an antilock brake system (ABS) or a vehicle regulator having an electronic stability program (ESP), the controlled variable may be the vehicle deceleration, a wheel slip, the driving speed, an angle of rotation or some other dynamic parameter which determines the driving response. Controlled variable f(t) is preselected as a setpoint value in the time diagram in FIG. 4. In addition, a tolerance band 22 within which the actual value for controlled variable f(t) may vary is given for controlled variable f(t). The tolerance band runs about the setpoint value, i.e., a setpoint value with a time lag. In normal operation within the tolerance band, the normal regulator operates with the desired comfort and harmonious coordination. Outside the tolerance band, the measure taken to intervene in the regulation is preferably more forceful and more severe.

The values for controlled variable f(t) and/or tolerance band 22 are stored in a suitable memory, e.g., an EEPROM, in the form of a table, a characteristic curve or in some other suitable form, and thus they may be accessed by regulator 11 at any time. Tolerance band 22 may be determined empirically or according to a worst case analysis.

In driving operation, regulator 11 according to FIG. 4 attempts to regulate actual value 24 in accordance with the measured system deviation so that it is within the given tolerance band 22. According to FIG. 3, regulator 11 determines system deviation 17 continuously and derives a suitable control value for triggering hydraulic system 12, 13 from stored tolerance band 22. A hydraulic system 13 then increases the pressure in the brake system, for example, and thus increases the deceleration of vehicle 14. The actual deceleration is then measured and system deviation 17 is again determined from that.

If the actual value for controlled variable f(t) is outside of tolerance band 22 according to the left-hand portion of the diagram in FIG. 4, then a correction device 15 intervenes and returns the actual value 24 of the controlled variable to I/P characteristics map 16 by increasing the trigger current for electric solenoid valve 1, for example. Then regulator 11 again assumes the triggering of hydraulic system 12, 13 on the basis of the stored engine characteristics map. With the help of correction device 15 an adaptive correction of the control characteristic is then performed. As an alternative, for example, in the right-hand portion of FIG. 4, a reduction in the trigger current is necessary because the actual value is below tolerance band 22.

What is claimed is:

1. A control circuit for a controllable electric solenoid valve of a brake system of a motor vehicle for adjusting a holding force for a valve closing body of the controllable electric solenoid valve, the control circuit comprising:

a regulator to predetermine a field current for the controllable electric solenoid valve according to a setpoint value of a predetermined controlled variable and to regulate an actual value of the predetermined controlled variable within a predetermined tolerance band; and a correction device to one of increase and decrease the field current when the actual value leaves the predetermined tolerance band for the setpoint value of the predetermined controlled variables, and to alter the field current as a function of a closing force of the controllable electric solenoid valve.

2. The control circuit of claim 1, wherein the correction device preselects a current/pressure characteristic curve as the predetermined controlled variable.

3. The control circuit of claim 1, wherein the correction device is operable to correct an actual value of a braking deceleration.

4. The control circuit of claim 1, wherein the correction device is operable to correct an actual value of a vehicle speed.

5. The control circuit of claim 1, wherein the correction device is operable to correct an actual value of a wheel slip value.

6. The control circuit of claim 1, wherein the correction device is operable to perform a brake intervention measure in conjunction with adaptive cruise control when the actual value drops below a setpoint value for the distance from an obstacle.

7. The control circuit of claim 1, further comprising:

a memory to store correction values for a trigger current as a function of one of the setpoint value of the controlled variable and the predetermined tolerance band.

8. The control circuit of claim 7, wherein the memory includes an EEPROM memory.

9. The control circuit of claim 1, wherein the correction device includes a computer to calculate the actual value of the controlled variable by executing a software program.

10. The control circuit of claim 1, wherein the correction device is operable to control at least one of an antilock brake system and an electronic stability program.

11. The control circuit of claim 1, wherein:

the correction device preselects a current/pressure characteristic curve as the predetermined controlled variable;

the correction device is operable to perform at least one of the following:

correct an actual value of a braking deceleration, correct an actual value of a vehicle speed, correct an actual value of a wheel slip value, and perform a brake intervention measure in conjunction with adaptive cruise control when the actual value drops below a setpoint value for the distance from an obstacle.

12. The control circuit of claim 11, further comprising:
a memory to store correction values for a trigger current as a function of one of the setpoint value of the controlled variable and the predetermined tolerance band.

13. The control circuit of claim 12, wherein the memory includes an EEPROM memory.

14. The control circuit of claim 12, wherein the correction device includes a computer to calculate the actual value of the controlled variable by executing a software program.

15. The control circuit of claim 12, wherein the correction device is operable to control at least one of an antilock brake system and an electronic stability program.

16. The control circuit of claim 12, wherein the correction device includes a computer to calculate the actual value of the controlled variable by executing a software program, and the correction device is operable to control at least one of an antilock brake system and an electronic stability program.

17. The control circuit of claim 11, wherein the correction device includes a computer to calculate the actual value of the controlled variable by executing a software program.

18. The control circuit of claim 11, wherein the correction device is operable to control at least one of an antilock brake system and an electronic stability program.

19. The control circuit of claim 11, wherein the correction device includes a computer to calculate the actual value of the controlled variable by executing a software program, and the correction device is operable to control at least one of an antilock brake system and an electronic stability program.

* * * * *

UNITED STATES PATENT AND TRADEMARK OFFICE

CERTIFICATE OF CORRECTION

PATENT NO. : 7,011,379 B2
APPLICATION NO. : 10/182589
DATED : March 14, 2006
INVENTOR(S) : Rader et al.

It is certified that error appears in the above-identified patent and that said Letters Patent is hereby corrected as shown below:

On the TITLE PAGE, ITEM (57) ABSTRACT, line 2, remove “is described,”

On the TITLE PAGE, ITEM (57) ABSTRACT, line 3, remove “(f(t))”

On the TITLE PAGE, ITEM (57) ABSTRACT, line 10, remove “(22)”

On the TITLE PAGE, ITEM (57) ABSTRACT, line 10, remove “(15)”

On the TITLE PAGE, ITEM (57) ABSTRACT, line 13, remove “(1)”

Column 1, line 5, change “BACKGROUND INFORMATION” to --FIELD OF THE INVENTION--

Column 1, lines 8-9, change “a motor vehicle according to the preamble of the main claim.” to --a motor vehicle.--

Column 1, line 9, insert the heading --BACKGROUND INFORMATION--

Column 1, lines 10-11, change “German Patent Application 43 05 488 A has already described” to--German Published Patent Application No. 43 05 488 discusses--

Column 1, line 21, change “German Patent Application 197 07 960 A1 also describes” to --German Published Patent Application No. 197 07 960 also discusses--

Column 1, line 35, change “ADVANTAGES OF THE INVENTION” to --SUMMARY OF THE INVENTION--

Column 1, line 37, change “The control circuit” to --The exemplary control circuit--

Column 1, lines 39-40, change “a motor vehicle having the characterizing features of the main claim has the advantage over the related art that” to --a motor vehicle provides that--

UNITED STATES PATENT AND TRADEMARK OFFICE

CERTIFICATE OF CORRECTION

PATENT NO. : 7,011,379 B2
APPLICATION NO. : 10/182589
DATED : March 14, 2006
INVENTOR(S) : Rader et al.

It is certified that error appears in the above-identified patent and that said Letters Patent is hereby corrected as shown below:

Column 1, line 43, change “It is especially advantageous here that the controlled” to --the controlled--

Column 1, line 49, remove “advantageously”

Column 1, lines 54-57, remove “Advantageous refinements... particularly advantageous that”

Column 1, lines 57-58, change “the correction device is designed to alter” to --the correction device is configured to alter--

Column 2, lines 2-3, change “It is also advantageous that to regulate” to --To regulate--

Column 2, line 9, change “It is also advantageous that the correction device” to --The correction device--

Column 2, line 14, change “A memory is advantageously provided” to --A memory is provided--

Column 2, line 19, change “An advantageous implementation” to --An exemplary embodiment--

Column 2, line 20, change “having a computer” to --including a computer--

Column 2, lines 21-22, change “Software programs have the great advantage that they are easily modifiable” to --Software programs are easily modifiable--

Column 2, line 24, change “having an antilock” to --including an antilock--

Column 2, line 29, remove “DRAWING”

Column 2, line 31, change “One embodiment” to --One exemplary embodiment--

Column 2, line 32, insert the heading --BRIEF DESCRIPTION OF THE DRAWINGS--

Column 2, line 41, change “DESCRIPTION” to --DETAILED DESCRIPTION--

Column 2, line 46, change “valve 1 has” to --valve 1 includes--

Column 2, line 47, change “body 4 is situated” to --body 4 is arranged--

Column 2, line 54, remove “preferably”

Column 2, line 56, remove “in detail”

UNITED STATES PATENT AND TRADEMARK OFFICE

CERTIFICATE OF CORRECTION

PATENT NO. : 7,011,379 B2
APPLICATION NO. : 10/182589
DATED : March 14, 2006
INVENTOR(S) : Rader et al.

It is certified that error appears in the above-identified patent and that said Letters Patent is hereby corrected as shown below:

Column 2, line 67, remove "in greater detail"

Column 2, line 67, change "of the embodiment" to --of the exemplary embodiment--

Column 3, line 2, change "the essential problem" to --the problem--

Column 3, line 15, change "which is not" to --which may not be--

Column 3, line 18, change "it must be possible" to --it must be allowable--

Column 3, line 23, change "Therefore, the implementation" to --Therefore, the exemplary embodiment--

Column 3, line 27, change "a vehicle regulator having" to --a vehicle regulator including--

Column 3, line 40, remove "preferably"

Signed and Sealed this

Twenty-sixth Day of December, 2006

JON W. DUDAS
*Director of the United States Patent and Trademark Office*